United States Patent
Nuber et al.

[11] Patent Number: 5,984,389
[45] Date of Patent: Nov. 16, 1999

[54] BUMPER

[75] Inventors: Walter Nuber, Goppingen; Manfred Huttner, Lenningen; Andreas Langer, Altbach, all of Germany

[73] Assignees: Daimler-Benz Aktiengesellschaft, Lennengen; Magna Pebra GmbH, Altbach, both of Germany

[21] Appl. No.: 08/928,663

[22] Filed: Sep. 12, 1997

[30] Foreign Application Priority Data

Sep. 13, 1996 [DE] Germany .......................... 196 37 512

[51] Int. Cl.$^6$ .................................................. B60R 19/22
[52] U.S. Cl. .......................................... 293/109; 293/136
[58] Field of Search .................................. 293/109, 110, 293/136, 107, 120, 121, 135

[56] References Cited

U.S. PATENT DOCUMENTS 4,213,644  7/1980  Scrivo et al. ..................... 293/136 X
4,361,352  11/1982  Wakamatsu ......................... 293/109 X
4,387,920  6/1983  Slaughter et al. ................... 293/136 X
4,482,180  11/1984  Huber et al. ....................... 293/136 X
4,941,701  7/1990  Loren ................................ 293/109 X Primary Examiner—D. Glenn Dayoan
Assistant Examiner—Jason Morrow
Attorney, Agent, or Firm—Antonelli, Terry, Stout & Kraus, LLP

[57] ABSTRACT

The invention concerns a bumper for a motor vehicle which is constructed mainly of molded plastic parts and optically appears to be part of the vehicle body. The bumper consists mainly of a support part (10) extending across the vehicle, three absorbing elements (12, 14, 14') that can be inserted into the support part, and an elastic exterior shell (16). On the lateral end sections, the support part (10) has lateral shells (22, 22') which extend between the lateral absorbing elements (14, 14') and the exterior shell (16). In a collision, the lateral shells (22, 22') yield backwards under the deformation of the absorbing elements (14, 14'), so that components attached to the lateral shells are protected from damage.

18 Claims, 3 Drawing Sheets

BUMPER

DESCRIPTION

The invention relates to a bumper for a motor vehicle with an elongated support part which can be attached to the front or rear of the motor vehicle body and which spans the width of the motor vehicle body, a thoric shock absorber extending along the support part, preferably consisting of foamed plastic, and an elastic exterior shell which can be firmly connected to the support part and which encompasses the front or rear of the motor vehicle in an approximate U shape, covering the visible side of the support part.

Bumpers of this type should not stand out optically on the vehicle, and should, through their shape, appear as if they were an integral component of the vehicle body. Therefore, it is necessary that mounting on the chassis is carried out in such a way that the visible gap between the exterior shell of the bumper and the exterior shell of the vehicle body is kept narrow and that the appearance of the gap is uniform. In order to achieve this in known embodiments, the support part is supported on the vehicle body side along its whole length. Between the support part and the convex exterior shell a continuous tunnel-shaped hollow space is provided into which the foam plastic shock absorber is placed. In a collision, the impact energy is converted into deformation work on the exterior shell and the absorber foam up to a certain threshold value, without damage to the vehicle, and whereby the reversibly deformable exterior shell and the shock absorber reassume their original form afterwards. In the known designs, it is considered a disadvantage that there are many mounting points on the vehicle body to support the bumper. In addition, it is difficult to adapt the absorber behavior to the various, sometimes country-specific, standards which, in some cases, lay down different threshold values for the damage-free absorbable impact energy for the front and corners of the vehicle. It has proven particularly disadvantageous that function elements, particularly fog lights, which are integrated into the bumper can only be mounted far from the exterior shell on the support part, or are particularly vulnerable to impact damage.

Taking this into consideration, the objective of the invention is to further develop the above-mentioned type of bumper in such a way that integration in the vehicle body and the possibility of integrating additional function units is improved, while continuing to ensure optimal bumper function.

In order to fulfil this objective, the combination of features in claim 1 is proposed. Advantageous embodiments and developments of the invention are shown in the claims.

The measures according to the invention permit the support part to participate with its lateral flanks in the deformation movement of the absorber during a collision without forfeiting the required stiffness for the support of the corner areas of the exterior trim.

According to a particularly advantageous embodiment of the invention, the shock absorber is constructed with separate absorbing elements in sections, whereby a central absorbing element can be inserted in a hollow that is limited by the exterior shell and the middle section of the support part, and whereby two lateral absorbing elements can be inserted into the lateral shells of the support part that is open to the vehicle body. This permits simple and variable adjustment of the absorbing elements with regard to their absorption behavior. In addition, the lateral absorber elements can easily be exchanged without disassembling the whole bumper.

A further improvement can be achieved in that the lateral absorber elements have lock notches at their faces that can lock into locking points on the support part, which is advantageous with regard to assembly, storage and repairs. In the mounted position, the lateral absorbing elements are supported directly on the vehicle body by means of a bearing surface on their back side.

Advantageously, the absorbing elements are made of a foamed plastic, in particular of expanded polypropylene. The absorption of the impact energy by the absorbing elements can be adapted in a simple way to specified values by applying various foam densities.

According to a further advantageous embodiment of the invention, holders are molded onto the lateral shells for fastening vehicle function units, in particular fog lights, optical and acoustic signal elements, sensors, spray nozzles, etc., thus permitting the arrangement of function units very close to the exterior shell, whereby, in a collision, the lateral yielding movement of the lateral shells also better protects the function units that are also moving.

In order to fasten the housing of a fog light close to the exterior shell, the lateral shells can have at least one flange protruding downwards, on which the fog lights can be mounted without additional holders.

In order to achieve optimal integration of the fog light from a design point of view, the exterior shell below the side shell can have an opening for the light rays, whereby the wall area bordering the opening for the light rays consists of an edge strip that is bent inwards towards the lens of the fog light, on which the lens is preferably supported by means of spacers molded onto the edge, providing for a uniform gap.

From the construction point of view, it is advantageous if the lateral shells have an approximately C-shaped convexity and an exterior surface shape that complements the bordering interior surface of the exterior shell.

The integration of the bumper shape is further improved in that the lateral shells have extensions molded onto the end sections that lock into end sections of the corner areas of the U-shaped exterior shell in order to support the lateral sides of the exterior shell.

The middle section of the support part advantageously consists of a rear wall transverse to the vehicle that can be supported on the vehicle body, preferably on a cross-member, and of an upper and lower longitudinal wall protruding from the rear wall to the exterior shell. This box-shaped design provides sufficient stiffness in the middle section of the support part. In order to improve the stiffness, it is also advantageous if the faces of the middle section are connected to the lateral shells by means of side walls separating the absorbing elements at the abutting faces.

A particularly advantageous attachment of the middle and the lateral shells to the vehicle body is achieved in that the support part has an upward protruding support arm in each area of the side walls, which can be attached to the vehicle body by means of screw connections.

In order to permit a vibration-free and at least partially tight-fit attachment of the support part to the cross-member of the vehicle body, springy tension tongues that protrude backward at an angle can be molded to the rear wall of the middle section which, when pressed against the cross-member, can be pressed under tension into openings in the rear wall. The press force is advantageously achieved in that the middle section of the support part, in the area of the tension tongues, has downward protruding support brackets that can be screwed onto the vehicle body.

In order to achieve a detachable connection of the support part and the exterior shell, the support part can have U-shaped contours at least at certain intervals along its upper and/or lower edge, which have locking slots at a certain distance from each other. In complement to this, the exterior shell has edges that form-fit into the U-shaped contours and which are fitted with locking tongues that lock into the locking slots.

Advantageously, the support part and the exterior shell are designed as one-piece molded plastic parts, in particular of polyurethane or a thermoplastic.

The invention is described below in more detail with reference to diagrams of an embodiment.

Figure 1:
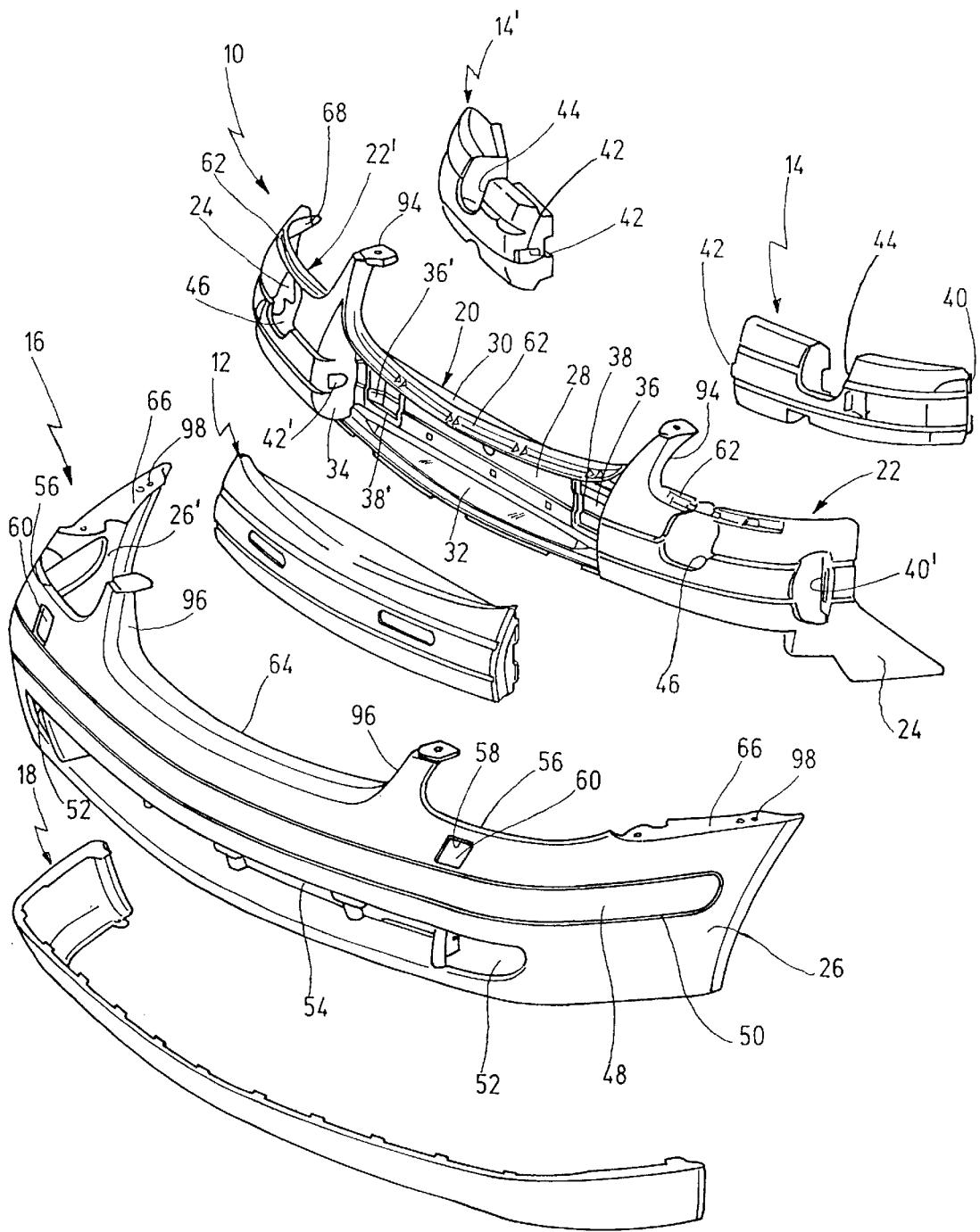
FIG. 1 shows an exploded view of a front bumper for a passenger vehicle.

The front bumper of a passenger vehicle illustrated in the drawing is constructed of molded plastic parts and mainly consists of an elongated support part 10, a shock absorber consisting of a center absorbing element 12 and two lateral absorbing elements 14, 14', an exterior shell 16 that can be firmly connected to the support part 10 as a covering for the visible side of the support part and the shock absorber, as well as a spoiler 18 that can be locked onto the lower edge of the exterior shell 16.

When mounted, the support part 10 that can be attached transversely at the front of the vehicle body consists of a middle section 20 spanning the area below the hood and two convex lateral shells 22, 22' with an approximately C-shaped cross section bordering the sides of the middle section and extending towards the vehicle corners. Extensions 24, 24' are molded to the end sections of the lateral shells 22, 22', protruding backward at an angle, for support of the lateral sides 26, 26' of the exterior shell 16 which extend towards the vehicle's wheel housings.

The U-shaped middle section 20 of the support part 10 has an inherent stability, due to the box-type design provided by a rear wall 28 that can be supported on a crossmember of the vehicle body, an upper and lower longitudinal wall 30, 32 and a side wall 34 at each of its faces. Backward-protruding springy tension tongues 36, 36' are molded onto the end sections of the rear wall 28 which, when mounted, sit under tension on the cross-member of the vehicle body and are pressed into openings 38, 38' of the rear wall 28.

The lateral absorbing elements 14, 14' form-fit into the lateral shells 22, 22' of the support part 10 which are open on the side facing the vehicle body, whereby locking elements 40, 42 that are molded onto the faces can be locked into corresponding locking recesses 40', 42' in the support part 10. In the mounted position, a recess 44 in the absorbing elements 14, 14' for the spray nozzle arrangement of a headlight cleaning device is aligned with respective openings 46 in the lateral shells 22, 22'. In contrast to the lateral absorbing elements 14, 14', the center absorbing element 12 is inserted from the front into the recess of middle section 20, which is closed on the side facing the vehicle body, whereby the surfaces of the absorbing element 12 facing the exterior shell and the lateral shells 22, 22' abut each other.

The exterior shell 16 is made of an elastic plastic and, on the visible side, is painted the same color as the car. An outward-protruding zone 48 which is particularly vulnerable to damage is offset from the rest of the surface area by means of a paint groove 50, so that partial painting is possible. In the lower corner areas of the covering 16, there are openings 52 for the light rays of the fog lights, between which an air inlet slot 54 extends. Below the sections 56 of the upper edge of the exterior shell 16 abutting the front light arrangement, there are punched openings 58 for a telescopic spray nozzle belonging to the headlight cleaning device, which are covered toward the outside by a swivelling flap 60.

In order to preassemble the bumper, the support part 10, equipped with the absorbing elements 12, 14, 14', is firmly connected to the exterior shell by means of a series of disengageable locking connections. At intervals along its upper edge, the support part 10 is provided with a U-shaped edge 62 (FIG. 1, 3) whose yoke members have locking slots at intervals. Accordingly, the upper edge of the exterior shell 16 has flange-shaped edge-strips 64 that are bent downward and form-fit into the U-shaped edges 62 and that have projecting locking tongues molded onto them which lock into the locking slots. This connection principle is also used to connect the lower edge of the support part 10 with a flange strip protruding towards the interior on the upper edge of the air inlet slot 54 of the exterior shell 16, whereby the join direction differs by 90°, so that the parts 10, 16, preattached to the upper edge, can be interlocked with the lower connection points by means of a swivel movement. In order to achieve an additional stabilization of the lateral side areas of the exterior shell 16 near the wheel housing, the fender side connection flange 66 of the lateral sides 26 is connected to a fastening surface 68, which extends beyond the end, by means of separate, metal support struts which are not shown in the illustration.

Figure 2:
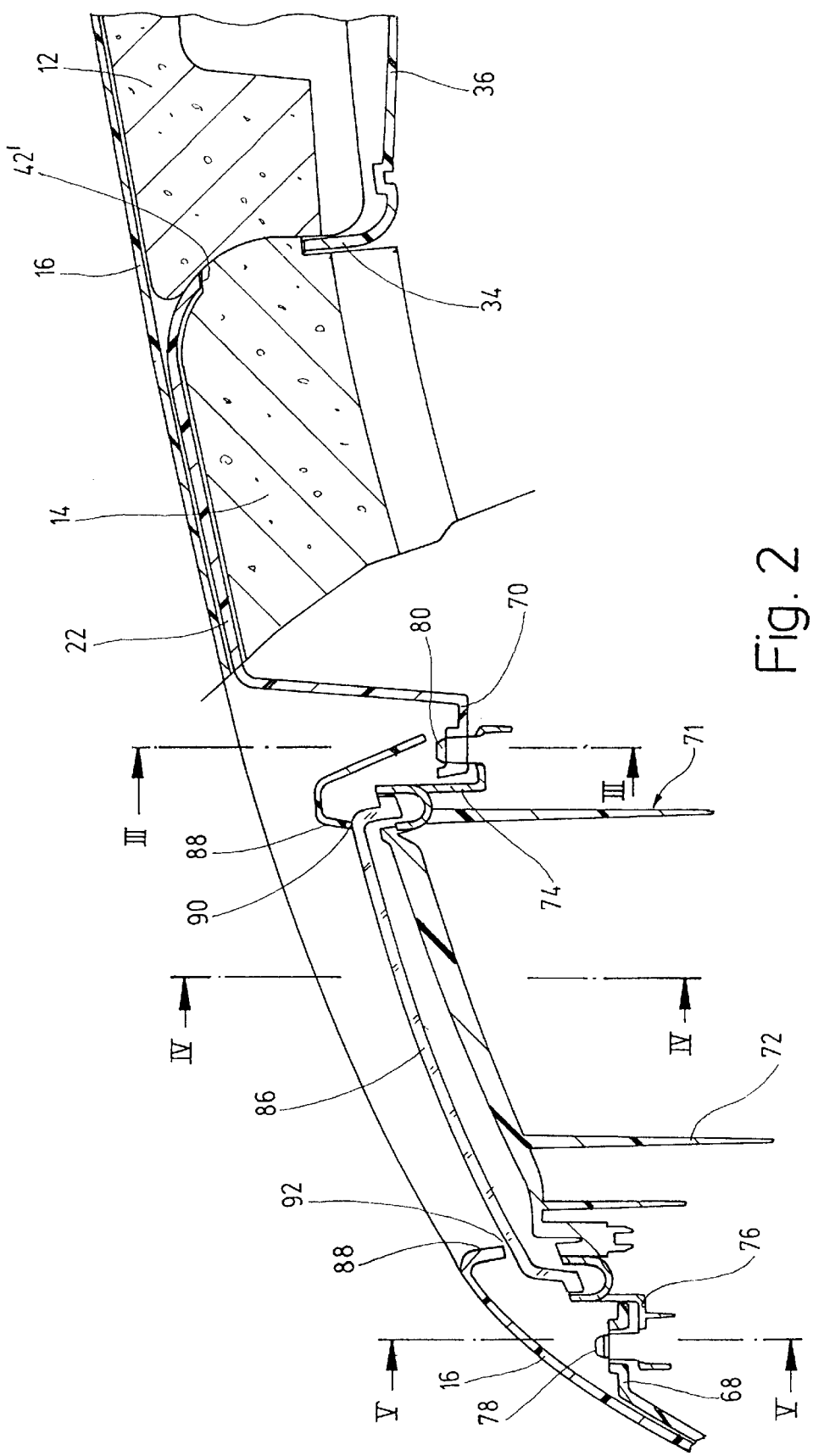
FIG. 2 shows a horizontal offset section of an enlarged detail of the bumper according to FIG. 1 at the height of a fog light and at the height of the shock absorber.
Figure 5:
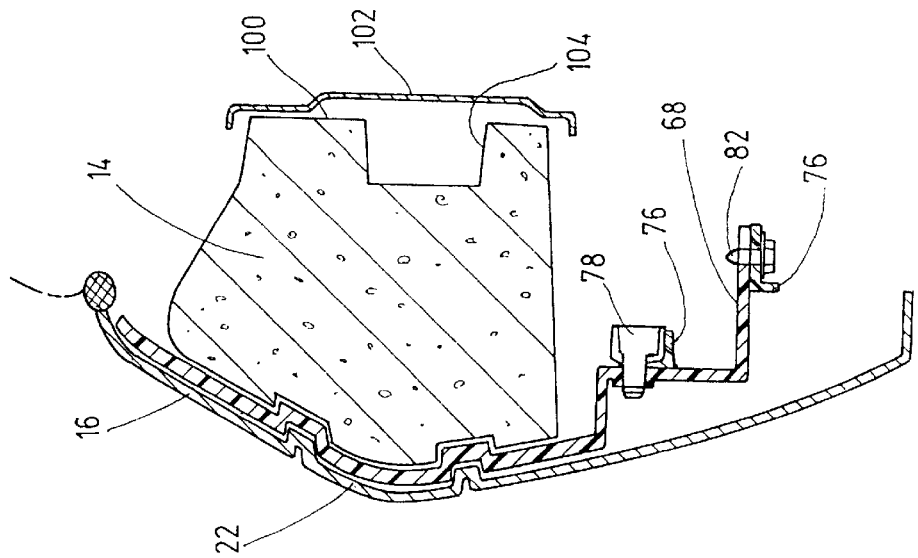
FIGS. 3–5 show vertical sections at the section lines in FIG. 2.
Figure 4:
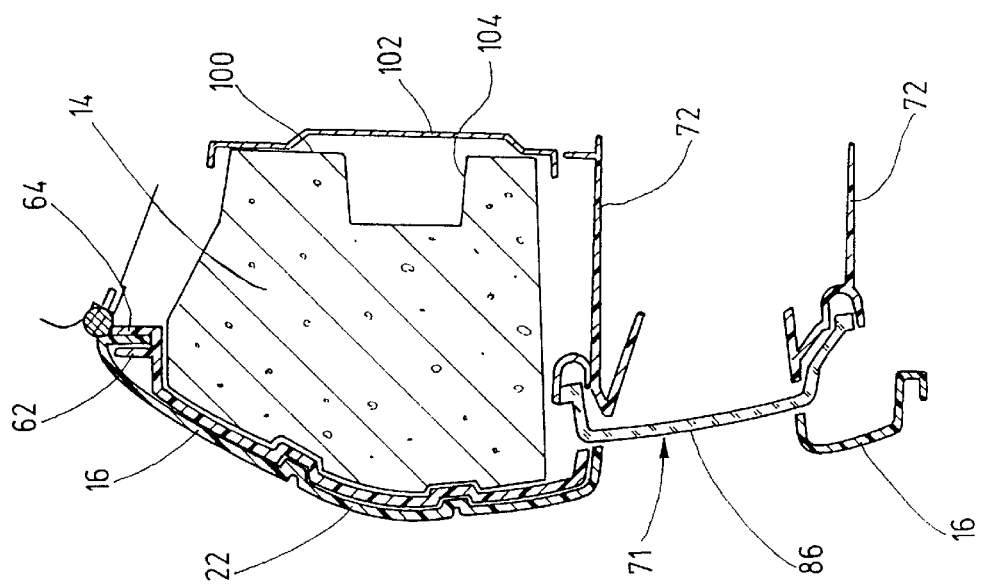
Figure 3:
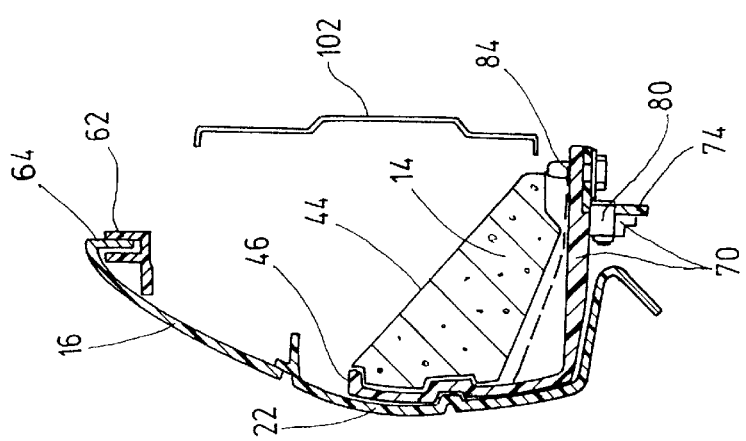

The vehicle's fog lights 71 are integrated in the bumper and, in a collision, are protected in a special way by their suspension on the lateral shells 22, 22' of the support part 10. As can be seen in the left part of the section in FIG. 2 and the vertical sections in FIG. 3 and 5, the lateral shells 22, 22' each have two flanges 68, 70 which protrude downward and are spaced laterally to each other, on which the plastic housing 72 of a fog light 71 can be attached by means of lateral extensions 74, 76. In order to do this, first of all, the fog light is pre-centered from the back of the bumper at the flanges 68, 70 by means of two centering tappets 78, 80, and then secured in its position by means of screw connections 82, 84. The rigid connection at the flanges 68, 70 ensures that, in a collision, the fog lights 71 and the lateral shells 22, 22' will yield backwards due to the deformation of the lateral absorbing elements 14, 14' and are, therefore, initially protected from damage. At the same time, the lens 86 of the fog light 71 can be positioned close to the exterior shell 16. In order to achieve a harmonious transition in the area of the lens 86, the wall area of the exterior shell 16 bordering the opening 52 for the light rays consists of an inward-bent edge strip 88 on which three spacers 90, protruding over the edge, are molded at certain positions around the circumference of the opening and on which the lens 86 is supported, providing for a uniform gap 92.

For mounting on the passenger vehicle, the support part 10 in the area of the side walls 34 is provided with upward-protruding support arms 94 which are covered by corresponding sections 96 of the exterior shell and can be screwed onto fastening points on the vehicle body. As further suspension points, downward-protruding support brackets (not illustrated) are provided in the area of the tension tongues 36, which can be screwed onto the lower side of the cross-member, if necessary by means of a support angle, as the tension tongues 36 are pressed onto the vehicle body's front cross member. In addition, screw connections 98 are provided which, at the connection flanges 66 of the exterior shell 16, reach through to the fenders.

In the mounted condition, the lateral absorbing elements 14, 14' are supported on a rear bearing surface 100 that faces away from the lateral shells 22, 22', and that sits directly on the closing plate 102 of the cross-member that is not shown. The closing plate 102 covers the U-shaped cross-member at the faces of its limbs. In order to advantageously transfer the collision forces introduced into the absorbing elements 14, 14' to the limbs of the cross-member, the bearing surface 100 of the absorbing elements 14, 14' is correspondingly bordered by a longitudinal slot 104.

The embodiment of the support part 10 described above permits the attachment of the bumper to the vehicle body with just a few screw connections. Due to the firmly connected upper edges of support part 10 and the exterior covering 16, an optimal connection to the adjacent exterior shell of the vehicle with a uniform, narrow gap is possible. Support part 10 supports the exterior shell 16, even in the areas where no direct attachment to the vehicle body is possible or provided for, particularly at the gap to the front lights and at the radiator grille.

SUMMARY

The invention concerns a bumper for a motor vehicle which is constructed mainly of molded plastic parts and optically appears to be part of the vehicle body. The bumper consists mainly of a support part 10 extending across the vehicle, three absorbing elements 12, 14, 14' that can be inserted into the support part, and an elastic exterior shell 16. On the lateral end sections, the support part 10 has lateral shells 22, 22' which extend between the lateral absorbing elements 14, 14' and the exterior shell 16. In a collision, the lateral shells 22, 22' yield backwards under the deformation of the absorbing elements 14, 14', so that components attached to the lateral shells are protected from damage.

We claim:

1. A bumper for a motor vehicle comprising an elongated support which can be attached to the front or rear of the motor vehicle body and which spans the width of the motor vehicle body, a shock absorber extending along the support part and extending towards the front or rear of the motor vehicle body in a substantially convex manner, and an elastic exterior shell which can be connected to the support part and which encompasses the front or rear of the motor vehicle in an approximate U shape, covering the side of the support part opposite the side facing the front or rear of the motor vehicle body wherein the support part has a middle section that can be firmly supported on the vehicle body, and two lateral shells adjacent to the sides of the middle section and extending between the shock absorber and the exterior shell, wherein the shock absorber is constructed with separate absorbing elements in sections, whereby a central absorbing element can be inserted in a hollow that is limited by the exterior shell and the middle section of the support part, and whereby two lateral absorbing elements can be inserted into the lateral shells of the support part that is open to the vehicle body, and wherein the lateral absorber elements have lock notches at their faces that can lock into locking points on the support part.

2. Bumper according to claim 1, wherein the lateral absorbing elements are supported directly on the vehicle body by means of a bearing surface on their back side which faces away from the lateral shells.

3. Bumper according to claim 1 wherein the absorbing elements are made of a foamed plastic, in particular of expanded polypropylene, whereby the lateral absorbing elements have a different density from that of the central absorbing element.

4. Bumper according to claim 1, wherein the lateral absorbing elements have a transverse recess for a vehicle function unit.

5. Bumper according to claim 1, wherein holders are moulded onto the lateral shells for fastening vehicle function units.

6. Bumper according to claim 1, wherein the lateral shells have at least one flange protruding downwards, on which the housing of a fog light can be mounted.

7. Bumper according to claim 1, A bumper for a motor vehicle comprising an elongated support which can be attached to the front or rear of the motor vehicle body and which spans the width of the motor vehicle body, a shock absorber extending along the support part and extending towards the front or rear of the motor vehicle body in a substantially convex manner, and an elastic exterior shell which can be connected to the support part and which encompasses the front or rear of the motor vehicle in an approximate U shape, covering the side of the support part opposite the side facing the front or rear of the motor vehicle body wherein the support part has a middle section that can be firmly supported on the vehicle body, and two lateral shells adjacent to the sides of the middle section and extending between the shock absorber and the exterior shell, wherein the exterior shell below the side shells has an opening for light rays of a fog light, and wherein the wall area of the exterior shell bordering the opening for the light rays comprises of an edge strip that is bent inwards towards the lens of the fog light, whereby a uniform gap is maintained between the edge strip and the lens by means of spacers moulded onto the edge.

8. Bumper according to claim 1, wherein the exterior shell has an air inlet slot below the middle section of the support part between two openings for fog light rays from a fog light.

9. Bumper according to claim 1, wherein the lateral shells have an approximately C-shaped convexity and an exterior surface shape that complements the bordering interior surface of the exterior shell.

10. Bumper according to claim 1, wherein the lateral shells have extensions moulded onto the end sections that lock into end sections of the corner areas of the U-shaped exterior shell in order to support the lateral sides of the exterior shell.

11. Bumper according to claim 1, wherein the middle section of the support part comprises a rear wall transverse to the vehicle that can be supported on the vehicle body, and an upper and lower longitudinal wall protruding from the rear wall to the exterior shell.

12. Bumper according to claim 1, wherein the faces of the middle section are connected to the lateral shells by means of side walls separating the absorbing abutting elements.

13. Bumper according to claim 12, wherein the support part has an upward protruding support arm in each area of the side walls, which can be attached to the vehicle body by means of screw connections.

14. Bumper according to claim 1, wherein springy tension tongues that protrude backward at an angle are moulded to a rear wall of the middle section which can be pressed under tension into openings in the rear wall.

15. Bumper according to claim 14, wherein the middle section of the support part, in the area of the tension tongues, has downward protruding support brackets that can be screwed onto the vehicle body.

16. Bumper according to claim 1, wherein the support part has U-shaped contours at least at certain intervals along at least one of its upper and lower edge, which have locking slots at a certain distance from each other, and in that the exterior shell has edges strips that form-fit into the U-shaped contours and onto which locking tongues are moulded that lock into the locking slots.

17. Bumper according to claim 1, wherein the support part and the exterior shell are designed as one-piece moulded plastic parts.

18. Bumper according to claim 17, wherein the support part and the exterior shell are made of polyurethane or a thermoplastic.

* * * * *